(12) United States Patent
Chapman

(10) Patent No.: US 11,388,308 B2
(45) Date of Patent: Jul. 12, 2022

(54) CREATING LABEL FORM TEMPLATES

(71) Applicant: Xerox Corporation, Norwalk, CT (US)

(72) Inventor: Edward N. Chapman, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 17/021,743

(22) Filed: Sep. 15, 2020

(65) Prior Publication Data

US 2022/0086301 A1 Mar. 17, 2022

(51) Int. Cl.
*H04N 1/23* (2006.01)
*G06V 30/414* (2022.01)
*H04N 1/387* (2006.01)

(52) U.S. Cl.
CPC ......... *H04N 1/233* (2013.01); *G06V 30/414* (2022.01); *H04N 1/3878* (2013.01)

(58) Field of Classification Search
CPC .. H04N 1/233; H04N 1/3878; G06K 9/00463; G06K 9/00288; G06K 9/00281; G06K 9/4642; G06K 9/00617; G06K 9/6256; G06K 9/00248; G06K 9/00255; G06K 9/6257; G05B 19/042; G05B 2219/2639; G06Q 10/0635; H04L 67/12
USPC ...................................................... 358/1.15
See application file for complete search history.

(56) References Cited

U.S. PATENT DOCUMENTS

| | | | | |
|---|---|---|---|---|
| 5,621,864 A | * | 4/1997 | Benade | G06K 1/121 |
| | | | | 358/1.18 |
| 6,868,411 B2 | * | 3/2005 | Shanahan | G06F 16/353 |
| | | | | 706/14 |
| 9,361,536 B1 | | 6/2016 | Howe et al. | |
| 9,438,867 B2 | * | 9/2016 | Wang | H04N 9/04551 |
| 9,785,627 B2 | | 10/2017 | Campanelli et al. | |
| 10,262,561 B2 | | 4/2019 | Li et al. | |
| 10,354,561 B2 | | 7/2019 | Maule et al. | |
| 10,887,023 B1 | * | 1/2021 | Leefer | H04W 4/46 |
| 2007/0195368 A1 | | 8/2007 | Waara | |
| 2011/0025883 A1 | * | 2/2011 | Shkurko | H04N 5/772 |
| | | | | 348/231.2 |
| 2013/0031145 A1 | | 1/2013 | Luo et al. | |
| 2014/0118560 A1 | * | 5/2014 | Bala | H04N 5/225 |
| | | | | 348/207.1 |
| 2014/0122988 A1 | * | 5/2014 | Eigner | G06Q 30/0269 |
| | | | | 715/226 |
| 2014/0237342 A1 | * | 8/2014 | King | G06F 16/955 |
| | | | | 715/224 |
| 2015/0199158 A1 | | 7/2015 | Ayash et al. | |

(Continued)

OTHER PUBLICATIONS

Xerox® Digital Alternatives, Client Software User Guide, Software Version 1.1, May 2015.

(Continued)

*Primary Examiner* — Negussie Worku

(74) *Attorney, Agent, or Firm* — Ortiz & Lopez, PLLC; Kermit D. Lopez; Luis M. Ortiz

(57) ABSTRACT

Methods and systems for creating labels from a template can involve correcting an image of a form captured by an image-capturing device, detecting in the image of the form a group of features including one or more polygons, and one or more writable areas in polygon(s), creating a template of the form based on the group of features detected in the image, and transmitting the template electronically to a requester of the template.

20 Claims, 8 Drawing Sheets

(56) References Cited

U.S. PATENT DOCUMENTS

| | | | |
|---|---|---|---|
| 2015/0363381 A1 | 12/2015 | Otaki | |
| 2016/0188938 A1* | 6/2016 | Summerfield | G06K 9/4604 |
| | | | 235/439 |
| 2019/0340753 A1* | 11/2019 | Brestel | G16H 15/00 |
| 2020/0167413 A1 | 5/2020 | Van Rotterdam | |
| 2020/0186983 A1 | 6/2020 | Roa et al. | |
| 2020/0264752 A1 | 8/2020 | Fang et al. | |

OTHER PUBLICATIONS

Wikipedia, Web Service, Retrieved from "https://en.wikipedia.org/w/index.php?title=Web_service&oldid=974727419", page was last edited on Aug. 24, 2020, at 17:18 (UTC).

* cited by examiner

CREATING LABEL FORM TEMPLATES

TECHNICAL FIELD

Embodiments are related to image processing methods, systems and devices. Embodiments also relate to the creation and generation of form templates. Embodiments further relate to rendering of printable labels and forms based on templates. In addition, embodiments relate to methods, systems and devices for capturing and rendering images, such as printers, scanners and digital cameras.

BACKGROUND

Printable labels may be purchased with form templates in, for example, PDF or Word format. FIG. 1 illustrates a top view of prior art labels 10 that can be implemented as rectangles on a sheet. These labels 10 can allow a user to 'know' where to place text, images or graphics so they are in the correct location.

For cases where a form template was not or is not available, it can be tedious for the user to create a form template, particularly when creating various forms in order to receive certain information or services.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing methods and systems.

It is another aspect of the disclosed embodiments to provide for the creation and generation of form templates.

It is further aspect of the disclosed embodiments to provide for the rendering of printable labels and forms based on form templates.

The aforementioned aspects and other objectives and advantages can now be achieved as described herein.

In an embodiment, a method for creating labels from a template, can involve: correcting an image of a form captured by an image-capturing device; detecting in the image of the form a plurality of features including at least one polygon, and at least one writable area in the at least one polygon; creating a template of the form based on the plurality of features detected in the image; and transmitting the template electronically to a requester of the template.

In an embodiment, correcting the image of the form captured by the image-capturing device can involve de-skewing the image.

An embodiment can further involve automatically configuring the template as a label form template for use as a printable label by the requester.

An embodiment can further involve capturing the image of the form with an image-capturing device.

In an embodiment, the image-capturing device can comprise a digital camera.

In an embodiment, the image-capturing device can comprise a scanner.

In an embodiment, the plurality of features further can further comprise one or more of: text, at least one image within the at least one polygon, and color in the at least one polygon.

In an embodiment, a system for creating labels from a template, can comprise: at least one processor; and a non-transitory computer-usable medium embodying computer program code, the computer-usable medium operable to communicate with the at least one processor. The computer program code can comprise instructions executable by the at least one processor and operable to: correct an image of a form captured by an image-capturing device; detect in the image of the form a plurality of features including at least one polygon, and at least one writable area in the at least one polygon; create a template of the form based on the plurality of features detected in the image; and transmit the template electronically to a requester of the template.

In an embodiment, the instructions executable by the at least one processor and operable to correct the image of the form captured by the image-capturing device, can further comprise instructions configured to: de-skew the image.

In an embodiment, the instructions can further comprise instructions executable by the at least one processor and operable to automatically configure the template as a label form template for use as a printable label by the requester.

In an embodiment, a system for creating labels from a template, can comprise: an image-capturing device that captures an image of a form that is then subject to a correction; a sensor that detects in the image of the form, a plurality of features including at least one polygon, and at least one writable area in the at least one polygon; and a template of the form created based on the plurality of features detected in the image, wherein the template is electronically transmitted to a requester of the template.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
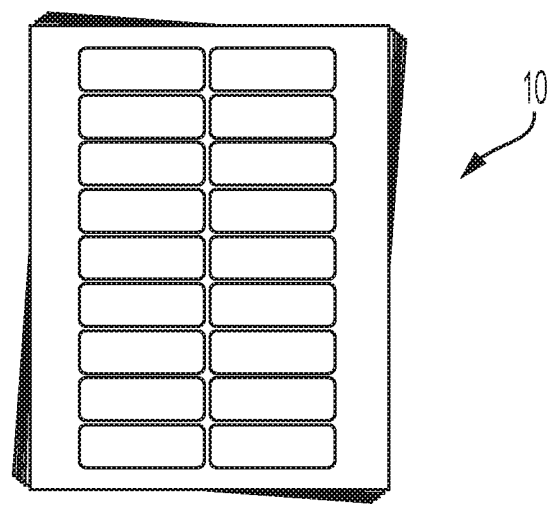
FIG. 1 illustrates a top view of prior art labels that can be implemented as rectangles on a sheet, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

As discussed previously, printable labels can be purchased with form templates in, for example, PDF or Microsoft Word format. These type of templates can allow a user to know where to place text, images or graphics so they are in the correct location with the template. For cases where a form template was or is not available, it can be tedious to create for the user to create his or her template.

The embodiments illustrated and described herein allow a user to scan an image of the form or take a digital picture or digital image with a digital camera or a device equipped with a camera such as a smartphone. The captured image can be then sent to a local or remote Web service or app. The image can be de-skewed or otherwise corrected via the local or remote Web service or app. The labels and the fillable parts of the label can be then determined and a template (e.g., in PDF or Microsoft Word) can be created. This template is returned to the requestor (the user who requested the template).

Note that one or more embodiments may involve the use of a software system and tools such as the Xerox® Digital Alternatives (DA), which is a personal productivity and collaboration tool that can provide an alternative to using paper documents. This tool can reinforce a strategy of, "Print for less, and print less," by providing a better alternative to printing documents. Xerox® Digital Alternatives (DA) or simply "DA" can be used to import, read, annotate, save, organize, and share documents within a single application. DA can be used simultaneously on a Windows® PC, laptop, smartphone and other mobile computing devices such as an Apple iPad®. DA can be used to facilitate the management of documents as an alternative to paper. With Windows® and iPad® applications, for example, a user can annotate, sign, and share documents from an efficient and intuitive interface. An example of DA is disclosed in the document "Xerox® Digital Alternatives Client Software User Guide, Software Version 1.1, May 2015," which is incorporated herein by reference in its entirety.

The above referenced Xerox® Digital Alternatives (DA) is one example of a Forms Digital Alternative (D/A) platform, which can include algorithms for detecting form fields and the writable area within an image.

Figure 2:
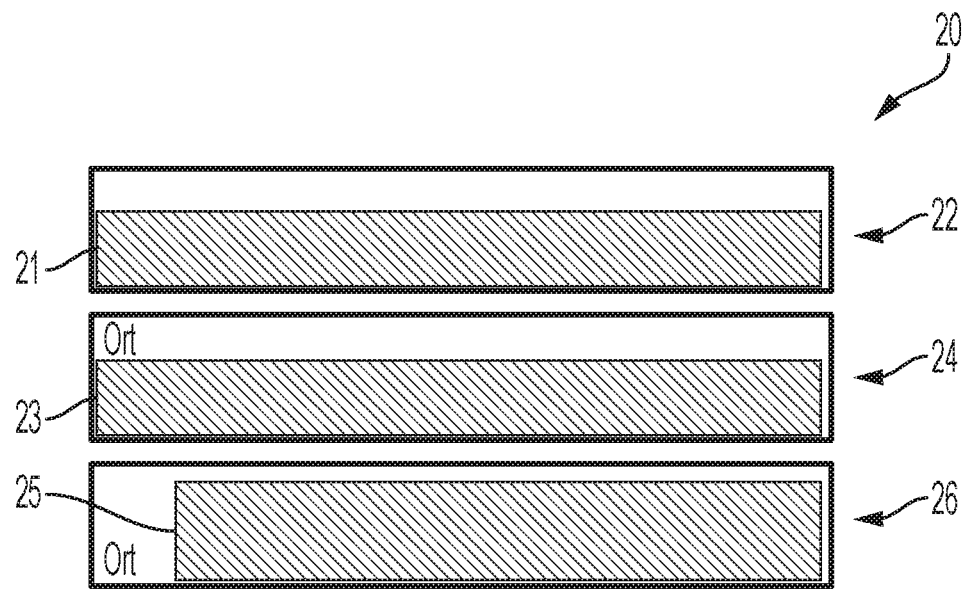
FIG. 2 illustrates a graphical view of form fields and writable areas, in accordance with an embodiment.

FIG. 2 illustrates a graphical view 20 of form fields 20 including a form field 22, a form field 24, and a form field 26 and respective writable areas including a writable area 21, a writable area 23, and a writable area 25, in accordance with an embodiment. FIG. 2 thus shows three rectangle form fields 22, 24, and 26 with their respective writeable areas 21, 23, and 25 (shown with shading in FIG. 2).

Figure 3:
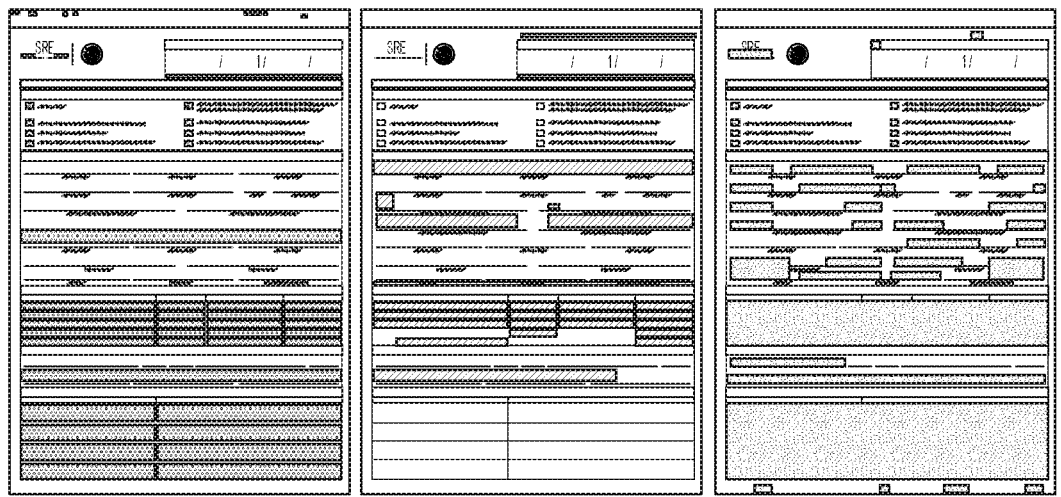
FIG. 3 illustrates digital form fields, in accordance with an embodiment.

FIG. 3 illustrates various digital form fields with forms 32, 34 and 36, in accordance with an embodiment. The forms 32, 34 and 36 may be implemented as electronic fillable forms having various form fields, check boxes, signatures lines, and so on. Some of the fillable form fields may not apply to labels such as the check boxes or signature lines. FIG. 3 thus demonstrates examples of fields that may not apply to label templates form. Green, shown in form 32 may be from the aforementioned Forms Digital Alternative (D/A) platform, magenta as shown in form 34 may be from an Adobe document, and cyan shown in form 36 may be from a Nuance. Rectangles with and without text may also be included as a part of such forms or documents.

Figure 4:
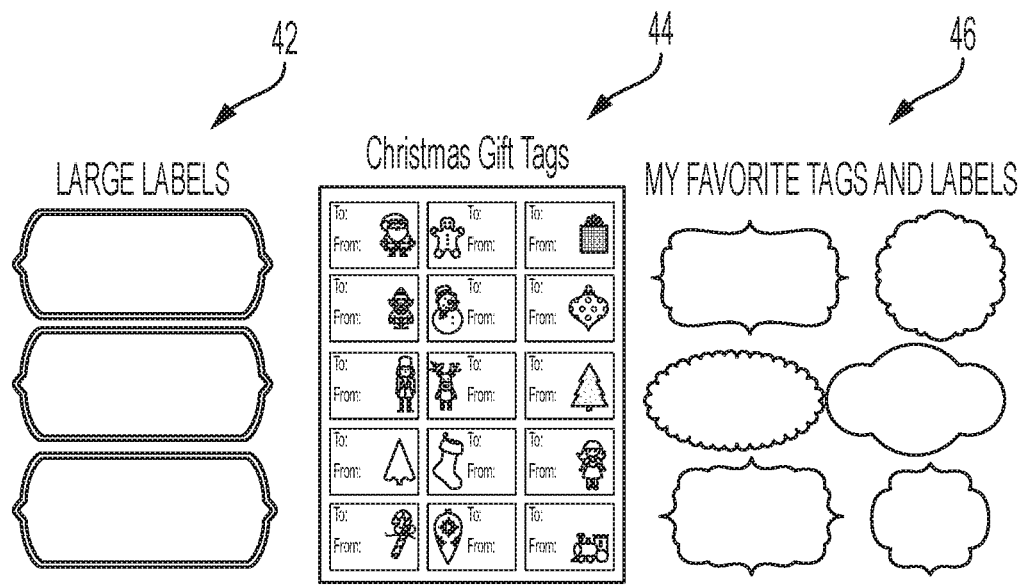
FIG. 4 illustrates other types of labels, which may be implemented in accordance with alternative embodiments.

FIG. 4 illustrates examples of other types of labels 42, 44, and 46, which may be implemented in accordance with alternative embodiments. Labels 42, for example, may be implemented as three empty irregular shaped labels. Labels 44 are examples of holiday themed labels including some text and graphics. Labels 46 shown in FIG. 4 are also examples of irregular shaped labels.

A methodology for creating a label form template, can thus be implemented as follows:
1) Scan or take photo of form
2) Send image to web service or app local or remote
3) De-skew or otherwise correct the image
4) Detect polygons
5) Detect text in polygons
6) Detect images in polygons
7) Detect color(s) in polygons
8) Detect writable area in polygons
9) Create template
10) Return template to requester Note that at least some of the operations described above can be implemented via a sensor. For example, a sensor may be used to implement one or more of the detection operations or steps 4 to 8 above. Such a sensor may be implemented via hardware and/or software. A scanner such as the scanner 129 shown in FIG. 9 and in association with modules, routines, and/or sub-routines, may be used as a sensor for detecting, for example, in the image of the form, a plurality of features including at least one polygon, and at least one writable area in the at least one polygon, and/or other features. Feature detection applications may also be utilized as a sensor or in association with a sensor to detect the aforementioned features. Note that term 'feature detection' as utilized herein can relate to an image-processing operation that can be performed as an operation on image including examining a pixel (or pixels) in the image to determine if there is a feature present at that pixel (or pixels).

Figure 5:
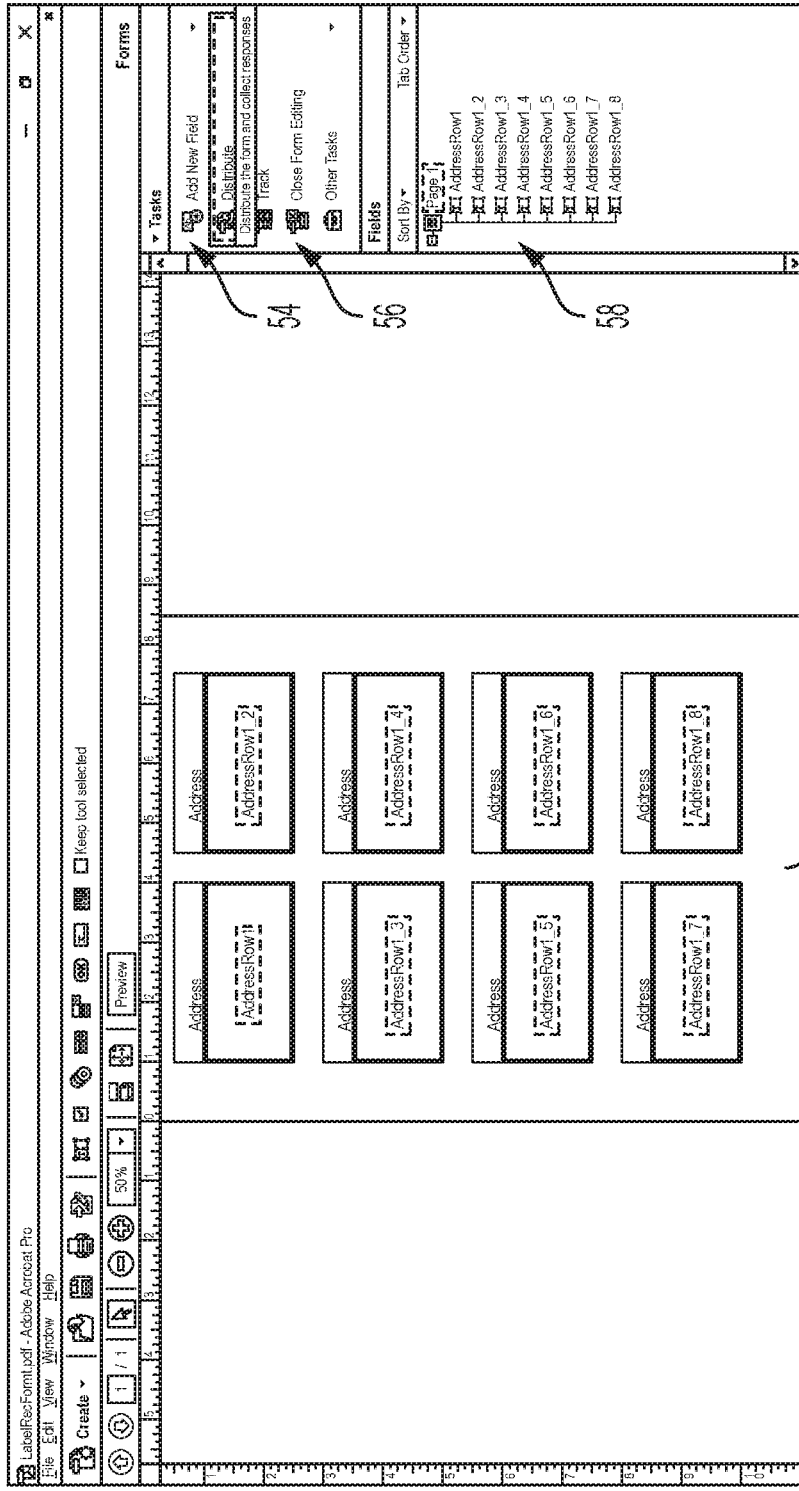
FIG. 5 illustrates an example PDF (Portable Document Format) form viewed with a graphical user interface (GUI) window that can facilitates the viewing, creation, manipulation, printing and managing files in PDF, in accordance with an embodiment.

FIG. 5 illustrates an example PDF (Portable Document Format) form viewed with a graphical user interface (GUI) window 50 that facilitates the viewing, creation, manipulation, printing and managing files in PDF, in accordance with an embodiment. FIG. 5 thus depicts a screen shot of an Adobe® Acrobat® Pro GUI window. The window 50 includes an area 54 that allows for the addition of new fields, an area 56 that allows for various functionalities such as tracking, close form editing and other tasks. An area 58 allows for the selection of, for example, particular address and rows associated with a graphically displayed template 52 of a sheet of address labels. FIG. 5 thus depicts a PDF form that can be viewed with, for example, an Adobe® Acrobat® application.

Figure 6:
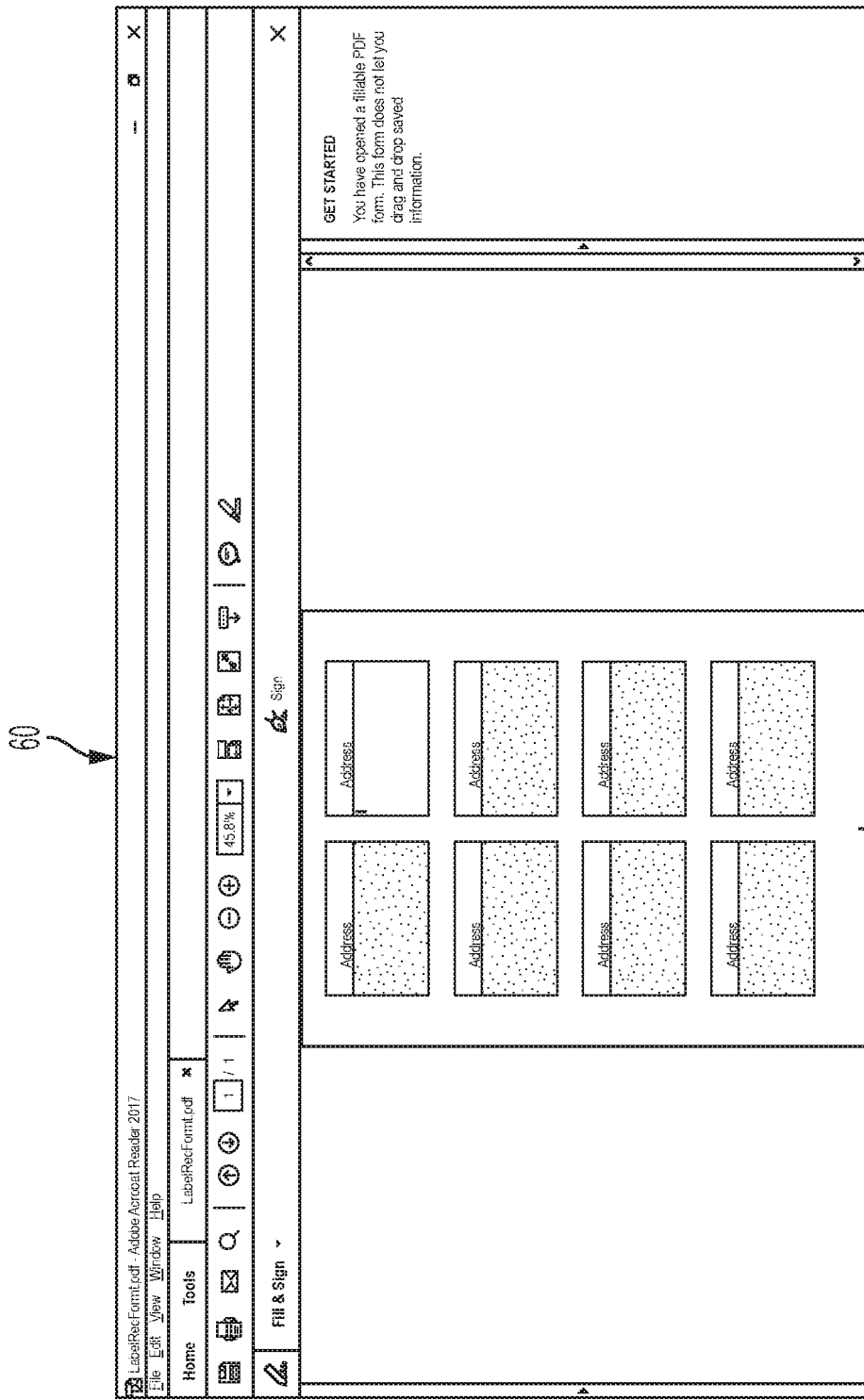
FIG. 6 illustrates a GUI window 60 displaying a label form template, in accordance with an embodiment.

FIG. 6 illustrates a GUI window 60 displaying a label form template 62, in accordance with an embodiment. The form template 62 shown in FIG. 2 is depicted without address information and settings such as the address/row conditions shown in the example embodiment in FIG. 5. Note that a difference between the GUI window 60 shown in FIG. 6 and GUI window 50 shown in FIG. 5 is that the GUI window depicted in FIG. 6 is implemented with a 'free reader' application rather than the more expensive 'Pro" application shown in FIG. 5.

That is, the label form template 62 shown in FIG. 5 can be viewed with the 'free' Adobe® Acrobat® Reader. With the free Reader, a user can now have the form template 62 with writable fields (shown in the shaded areas). Note that the cursor may be in the upper right box. This template can be created at the same size as the originals so as to ensure no scaling is used when printing.

Figure 7:
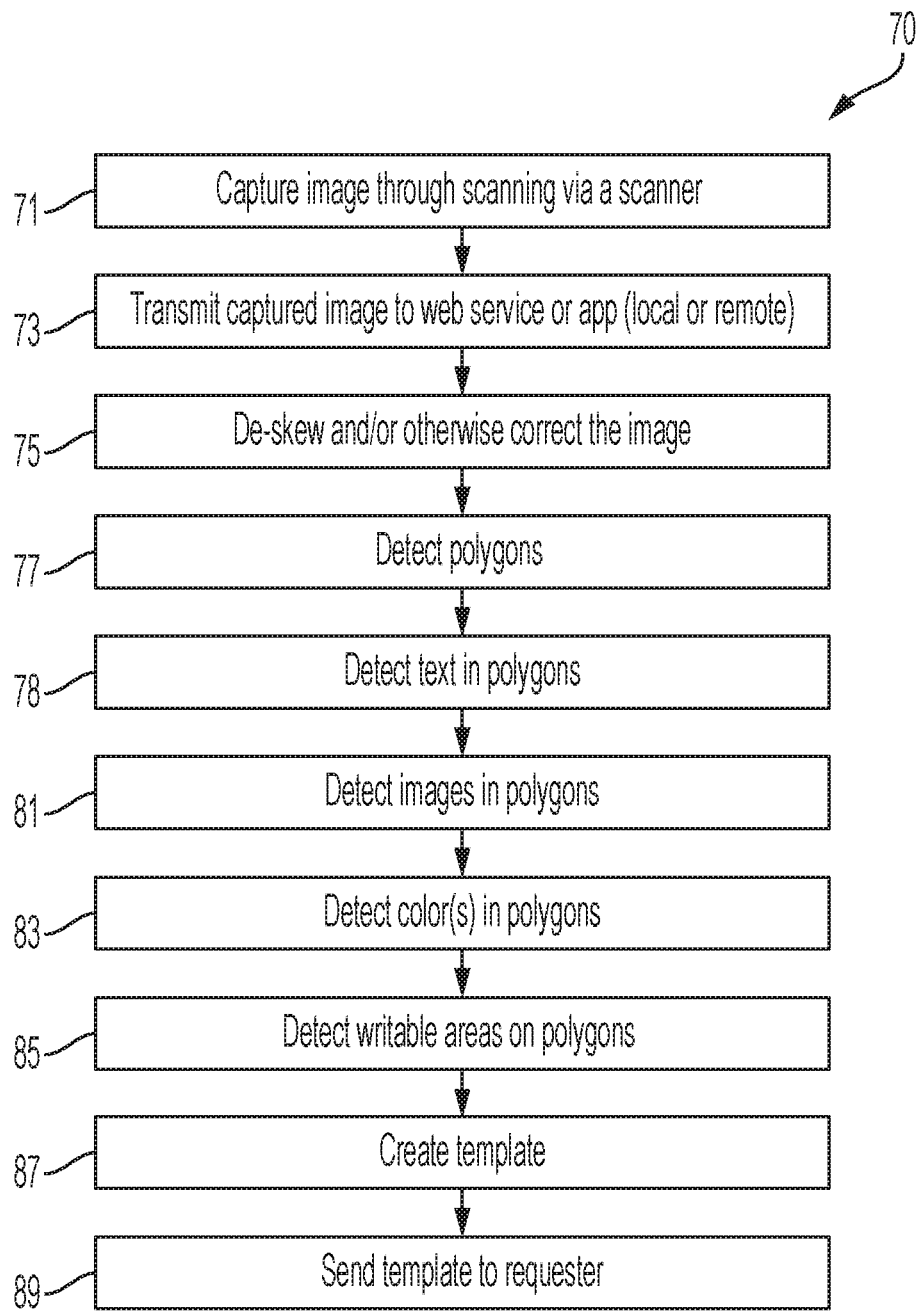
FIG. 7 illustrates a flow chart of operations illustrating logical operational steps of a method for creating a label form template, in accordance with an embodiment.

FIG. 7 illustrates a flow chart of operations illustrating logical operational steps of a method 70 for creating a label form template, in accordance with an embodiment. As shown in FIG. 7, a step or operation can be implemented, as shown at block 71, to capture an image of a form with a scanner.

Figure 9:
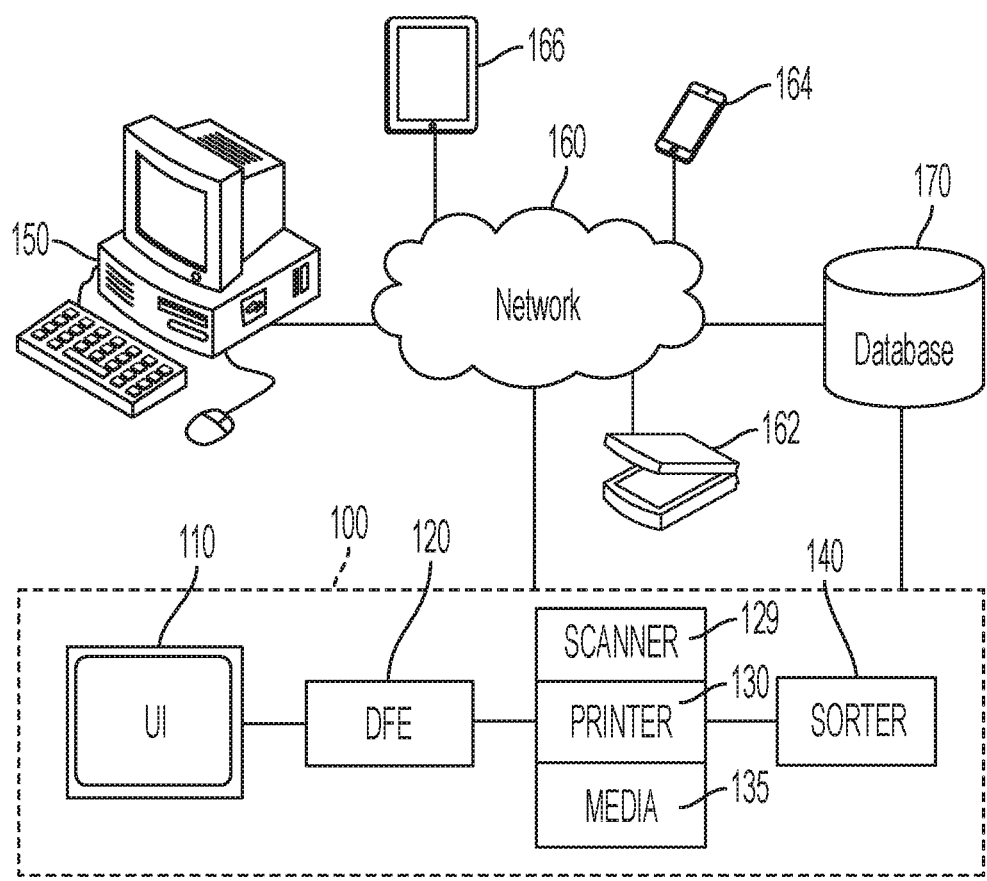
FIG. 9 illustrates a block diagram of a printing system suitable for implementing one or more of the disclosed embodiments.

Note that the term 'scanner' as utilized herein can refer to an image scanner, which is a device that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 100 shown in FIG. 9 and FIG. 10. For example, the scanner 129 is shown in FIG. 9 as a part of the printing system 100. Alternatively, or in addition to the scanner 129 included as a part of the printing system 100, the scanner may be implemented as a separate scanner 162 also depicted in FIG. 9, which can communicate with the network 160.

Following process of the step or operation depicted in block 71, a step or operation can be implemented, as shown at block 73, to send the captured image (i.e., the image of the form or other document) to a Web service or app, which may be local or remote. Note that the term "Web service" as utilized herein can relate to a service offered by an electronic device to another electronic device, communicating with each other via the World Wide Web, or a server running on a computer device, listening for requests at a particular port over a network, serving web documents (HTML, JSON, XML, images), and creating applications services, which can serve in solving specific domain problems over the Web (WWW, Internet, HTTP).

Next, as shown at block 75, a step or operation can be implemented to de-skew or and/or otherwise correct the image. Note that the term 'de-skew' (or 'deskew') as utilized herein can relate to a process of straightening an image that has been scanned or photographed crookedly—that is, an image that may be slanting too far in one direction, or which may be misaligned. Graphics software or routines (including any sub-routines) may be used to implement this process. The aforementioned de-skew or deskewing operation is an example of an image processing operation that can operate on an item of data that relates to a part of the captured (e.g., scanned) image.

Following processing of the step or operation depicted at block 75, a step or operation, as shown at block 77, can be implemented to detect polygons in the image. Thereafter, a step or operation can be implemented, as shown at block 78 to detect text in the polygons. Then, as shown at block 81, a step or operation can be implemented to detect images in the polygons. Next, as shown at block 83, a step or operation can be implemented to detect color(s) in the polygons. Thereafter, as depicted at block 85, a step or operation can be implemented to detect one or more writable areas in the polygons. Then, as illustrated at block 87, a step or operation can be implemented to create the template (e.g., a form template) based on the aforementioned features detected in the image. The created template can be then electronically returned to the user who had originally requested the creation of the template.

Figure 8:
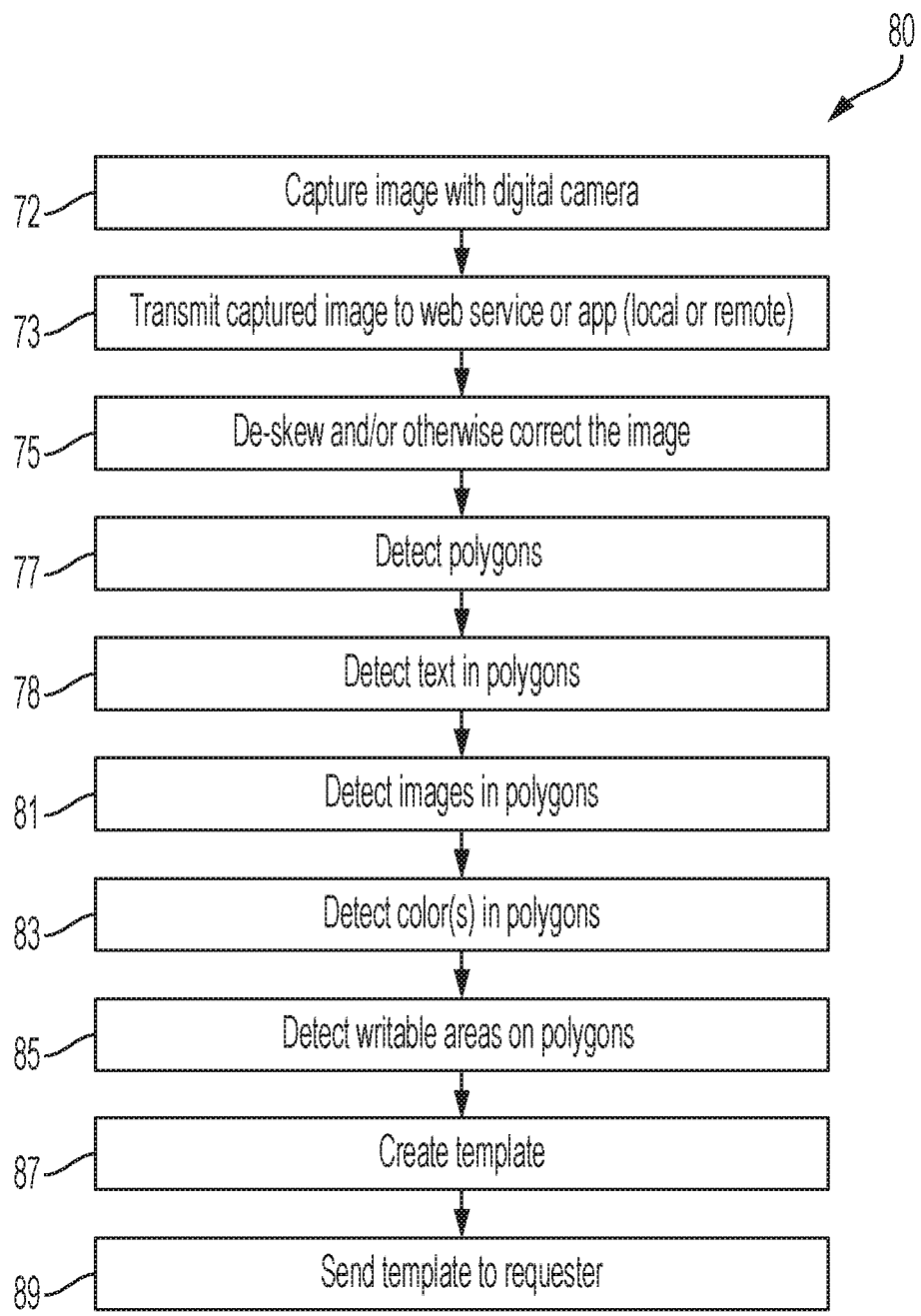
FIG. 8 illustrates a flow chart of operations illustrating logical operational steps of a method for creating a label form template, in accordance with an alternative embodiment.

FIG. 8 illustrates a flow chart of operations illustrating logical operational steps of a method 90 for creating a label form template, in accordance with an alternative embodiment. Note that the as utilized herein, identical or similar reference numerals refer generally to identical or similar parts or elements. Thus, the alternative embodiment of method 90 shown in FIG. 8 depicts most of the same operations shown in FIG. 7 with the exception that of the step or operation depicted at block 72, which involves capturing an image of the form or document to be 'templatized' with a digital camera rather than a scanner. Such a digital camera may be, for example, a digital camera associated with a smartphone or table computing device such as the table computing device 166 (e.g., an Apple iPad®).

With reference to FIG. 9, the printing system (or image rendering system) 100 suitable for implementing various aspects of the exemplary embodiments described herein is illustrated.

The word "printer" and the term "printing system" or "printing device" or "printing apparatus" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose. A printer, a printing system, a printing device is an example of a rendering device for rendering a document such as a printed form, label or image.

The printing system 100 depicted in FIG. 9 can include a user interface 110, a digital front end (DFE) controller 120, and at least one print engine 130 ('printer) and the aforementioned scanner 129. The print engine 130 and the scanner 129 may have access to print media 135 of various sizes and cost for a print job or a scanning job. In some embodiments, the printing system 100 can comprise a color printer having multiple color marking materials. In other embodiments, the printing system 100 may comprise an MFD.

A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 can operate after a job is printed by the print engine 130, to manage arrangement of the hard copy output, including cutting functions. A user can access and operate the printing system 100 using the user interface 110 or via a data-processing system such as a workstation 150. The workstation 150 can communicate bidirectionally with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art. The network 160 may be implemented as a 'cloud computing' network, sometimes also referred to as a 'cloud based network', a 'cloud based platform' or simply 'the cloud'.

Figure 10:
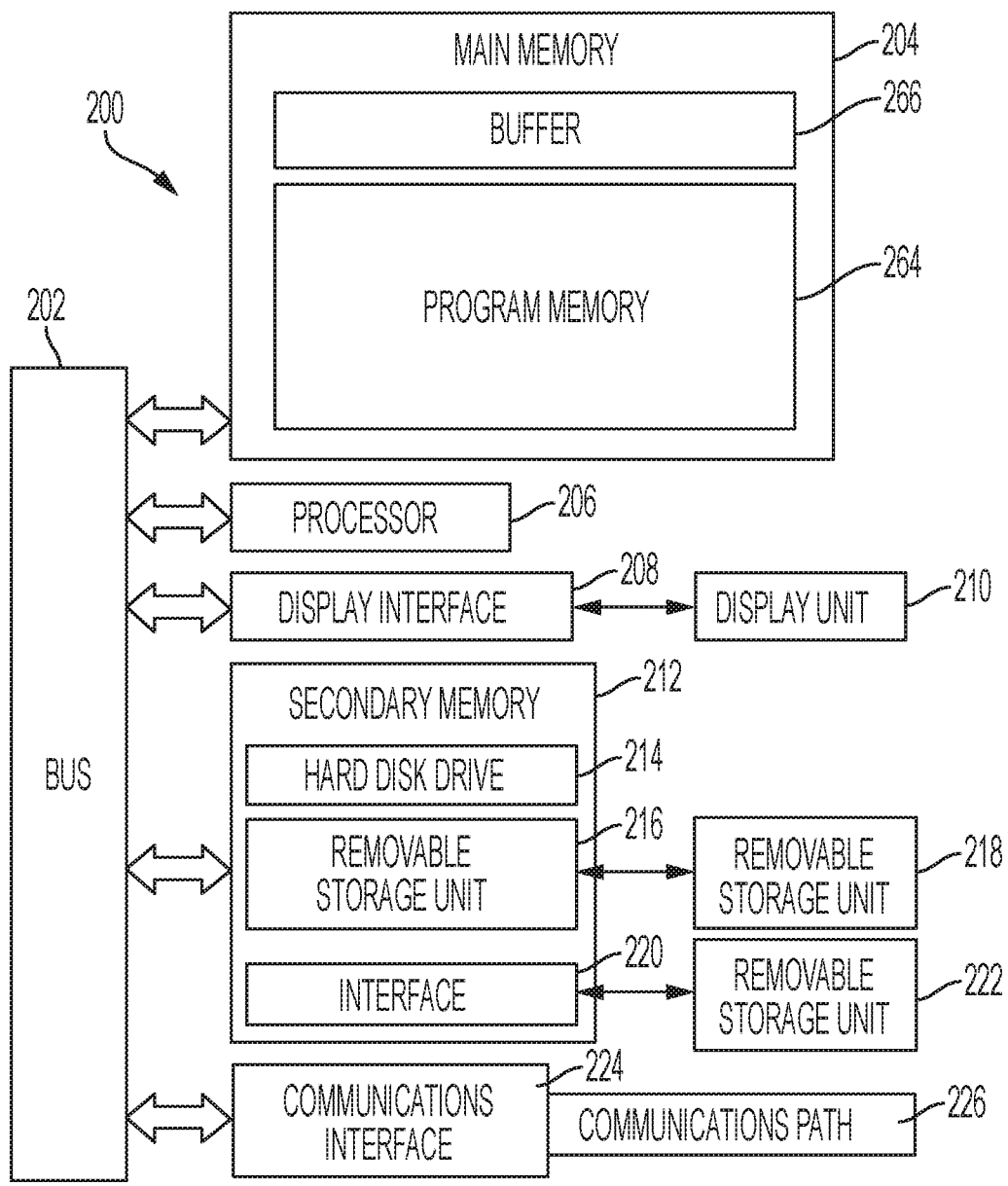
FIG. 10 illustrates a block diagram of a digital front end controller useful for implementing one or more embodiments.

With respect to FIG. 10, an exemplary DFE (Digital Front End) controller 200 is shown in greater detail. The DFE controller 200 can include one or more processors, such as processor 206 capable of executing machine executable program instructions. The processor 206 may function as a DFE processor or another type of processing device.

In the embodiment shown, the processor 206 can be in communication with a bus 202 (e.g., a backplane interface bus, cross-over bar, or data network). The digital front end 200 can also include a main memory 204 that is used to store machine readable instructions. The main memory 204 is also capable of storing data. The main memory 204 may alternatively include random access memory (RAM) to support reprogramming and flexible data storage. A buffer 266 can be used to temporarily store data for access by the processor 206.

Program memory 264 can include, for example, executable programs that implement the embodiments of the methods described herein. The program memory 264 can store at least a subset of the data contained in the buffer. The digital front end 200 can include a display interface 208 that forwards data from communication bus 202 (or from a frame buffer not shown) to a display 210. The digital front end 200 can also include a secondary memory 212 includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively may include other similar mechanisms for allowing computer programs or other instructions to be loaded into the computer system. Such mechanisms can include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end 200 can include a communications interface 224, which acts as both an input and an output to allow software and data to be transferred between the digital front end 200 and external devices. Examples of a communications interface include a modem, a network interface (such as an Ethernet card), a communications port, a PCM-CIA slot and card, etc.

Computer programs (also called computer control logic) and including one or more modules may be stored in the main memory 204 and/or the secondary memory 212. Computer programs or modules may also be received via a communications interface 224. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data generally stored in secondary memory 212 for access during an DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative embodiments, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be embodied by special purpose hardware-based systems that perform the specified functions or acts or carry out combinations of special purpose hardware and computer instructions.

The functionalities described herein may be embodied entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term 'module' may also simply refer to an application, such as a computer program designed to assist in the performance of a specific task, such as word processing, accounting, inventory management, etc.

Such an application may be an 'app' as discussed previously. The term 'app' as utilized herein can refer to an 'application program' or simply an 'application'. An app may be downloaded from an online service, such as an "app store" and installed on a smartphone (e.g. a smartphone or other smart device such as tablet computing device or a wearable computing device such as a smartwatch). An app may comprise a module or a group of modules and/or a group of sub-modules.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 100 shown in FIG. 9 and/or the DFE controller 200 shown in FIG. 10. A "module" can perform the various steps, operations or instructions discussed herein, such as the steps or operations discussed herein with respect to FIG. 7 and FIG. 8.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the disclosed embodiments. The claimed solution may be rooted in computer technology in order to overcome a problem specifically arising in the realm of computers, computer networks and call center platforms.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for creating labels from a template, comprising:
   correcting an image of a form captured by an image-capturing device;
   detecting in the image of the form with a sensor, a plurality of features including at least one polygon, and at least one writable area in the at least one polygon, the sensor comprising at least one of a scanner and a feature detection application;
   creating a template of the form based on the plurality of features detected in the image; and
   transmitting the template electronically to a requester of the template.

2. The method of claim 1 wherein correcting the image of the form captured by the image-capturing device comprises:
   de-skewing the image.

3. The method of claim 1 further comprising automatically configuring the template as a label form template for use as a printable label by the requester.

4. The method of claim 1 further comprising capturing the image of the form with an image-capturing device.

5. The method of claim 4 wherein the image-capturing device comprises a digital camera.

6. The method of claim 4 wherein the image-capturing device comprises the scanner.

7. The method of claim 1 wherein the plurality of features further comprises at least one of: text, at least one image within the at least one polygon, and color in the at least one polygon.

8. A system for creating labels from a template, comprising:
   at least one processor; and
   a non-transitory computer-usable medium embodying computer program code, the computer-usable medium operable to communicate with the at least one processor, the computer program code comprising instructions executable by the at least one processor and operable to:
   correct an image of a form captured by an image-capturing device;
   detect in the image of the form with a sensor, a plurality of features including at least one polygon, and at least one writable area in the at least one polygon, the sensor comprising at least one of a scanner and a feature detection application;
   create a template of the form based on the plurality of features detected in the image; and
   transmit the template electronically to a requester of the template.

9. The system of claim 8 wherein the instructions executable by the at least one processor and operable to correct the image of the form captured by the image-capturing device, further comprise instructions configured to:
de-skew the image.

10. The system of claim 8 wherein the instructions further comprise instructions executable by the at least one processor and operable to automatically configure the template as a label form template for use as a printable label by the requester.

11. The system of claim 8 further comprising capturing the image of the form with an image-capturing device.

12. The system of claim 11 wherein the image-capturing device comprises a digital camera.

13. The system of claim 11 wherein the image-capturing device comprises the scanner.

14. The system of claim 8 wherein the plurality of features further comprises at least one of: text, at least one image within the at least one polygon, and color in the at least one polygon.

15. A system for creating labels from a template, comprising:
an image-capturing device that captures an image of a form that is then subject to a correction;
a sensor that detects in the image of the form, a plurality of features including at least one polygon, and at least one writable area in the at least one polygon, the sensor comprising at least one of a scanner and a feature detection application; and
a template of the form created based on the plurality of features detected in the image, wherein the template is electronically transmitted to a requester of the template.

16. The system of claim 15 wherein the correction comprises de-skewing of the image captured by the image-capturing device.

17. The system of claim 15 wherein the template is automatically configured as a label form template for use as a printable label by the requester.

18. The system of claim 15 wherein the image-capturing device comprises a digital camera.

19. The system of claim 15 wherein the image-capturing device comprises the scanner.

20. The method of claim 15 wherein the plurality of features further comprises at least one of: text, at least one image within the at least one polygon, and color in the at least one polygon.

* * * * *